(12) United States Patent
Nakada (10) Patent No.: US 9,242,594 B2
(45) Date of Patent: Jan. 26, 2016

(54) VEHICULAR LAMP

(71) Applicant: KOITO MANUFACTURING CO., LTD., Tokyo (JP)

(72) Inventor: Asami Nakada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 147 days.

(21) Appl. No.: 14/095,089

(22) Filed: Dec. 3, 2013

(65) Prior Publication Data

US 2014/0160778 A1 Jun. 12, 2014

(30) Foreign Application Priority Data

Dec. 7, 2012 (JP) .................. 2012-268355

(51) Int. Cl.
| | |
|---|---|
| *F21S 8/10* | (2006.01) |
| *B60Q 1/26* | (2006.01) |
| *G02B 6/43* | (2006.01) |
| *B60Q 1/00* | (2006.01) |
| *F21V 8/00* | (2006.01) |

(52) U.S. Cl.
CPC ............ *B60Q 1/0058* (2013.01); *B60Q 1/2607* (2013.01); *F21S 48/215* (2013.01); *F21S 48/2237* (2013.01); *F21S 48/2243* (2013.01); *F21S 48/2268* (2013.01); *F21S 48/2281* (2013.01); *G02B 6/002* (2013.01); *G02B 6/0038* (2013.01); *G02B 6/0036* (2013.01)

(58) Field of Classification Search
CPC ..... F21S 48/00; F21S 48/215; F21S 48/2237; F21S 48/2243; F21S 48/2275; F21S 48/2281; F21S 48/2268; F21S 48/225; B60Q 1/0058; B60Q 1/2607; G02B 6/002; G02B 6/0036; G02B 6/0038

See application file for complete search history.

(56) References Cited

U.S. PATENT DOCUMENTS

| | | | | |
|---|---|---|---|---|
| 5,711,592 | A | * | 1/1998 | Hotta ............................. 362/496 |
| 5,835,661 | A | * | 11/1998 | Tai et al. ........................ 385/146 |
| 6,036,340 | A | * | 3/2000 | Fohl et al. ..................... 362/511 |
| 6,799,860 | B2 | * | 10/2004 | Nakaoka .............. G02B 6/0021 |
| | | | | 362/23.15 |
| 7,223,006 | B2 | * | 5/2007 | Sugiura ................ G02B 6/0028 |
| | | | | 349/63 |
| 7,263,268 | B2 | * | 8/2007 | Inditsky ........................ 385/146 |
| 2007/0189036 | A1 | * | 8/2007 | Chen .................... G02B 6/0036 |
| | | | | 362/613 |
| 2010/0073954 | A1 | * | 3/2010 | Gebauer ........................ 362/551 |

FOREIGN PATENT DOCUMENTS

JP 2012190762 10/2012

* cited by examiner

*Primary Examiner* — Alan Cariaso
(74) *Attorney, Agent, or Firm* — Abelman, Frayne & Schwab (57) ABSTRACT

Disclosed is a vehicular lamp having a light source and a light guide body. In the vehicular lamp, the light guide body is configured by a first and a second rod shaped light guiding portions disposed at positions spaced apart from each other, and a planar light guiding portion disposed to connect the circumferential surface portions of the first and second rod shaped light guiding portions with each other. Further, the light source configured to include a first light source and a second light source disposed to cause light to be incident from an end portion surfaces of the first and the second rod shaped light guiding portions, respectively, and then configured to make each of the first light source and the second light source to emit a different color light with each other.

8 Claims, 6 Drawing Sheets

VEHICULAR LAMP

CROSS-REFERENCE TO RELATED APPLICATIONS

This application is based on and claims priority from Japanese Patent Application No. 2012-268355, filed on Dec. 7, 2012 with the Japan Patent Office, the disclosure of which is incorporated herein in its entirety by reference.

TECHNICAL FIELD

The present disclosure relates to a vehicular lamp which includes a light guide body.

BACKGROUND

There has been known a vehicular lamp having a configuration in which a light guide body disposed to cause light emitted from a light source to be incident thereto and then emitted toward the front side of the vehicular lamp, is provided.

Japanese Patent Application No. 2012-190762 discloses a configuration in which a rod shaped light guiding portion and a planar light guiding portion extending from a circumferential surface portion thereof are provided as the light guide body in the vehicular lamp. Also, the light guide body is configured such that some of light emitted from a light source, which is incident from one end surface of the rod shaped light guiding portion and then guided to the rod shaped light guiding portion, is allowed to be incident onto the planar light guiding portion, and then emitted from the planar light guiding portion toward a front of the vehicular lamp.

It is possible to secure a luminescent region widened in planar shape in the vehicular lamp described in Japanese Patent Application No. 2012-190762.

However, in such a vehicular lamp, a plurality of pairs of light sources and light guide bodies are required in order for the vehicular lamp to make a luminescent region luminescent with a plurality of luminescent colors and thus, the vehicular lamp may not be configured compactly, which is problematic.

The present disclosure has been made in an effort to solve the problems, and intends to provide a vehicular lamp equipped with a light guide body that may be implemented with a compact configuration while making a luminescent region widened in a planar shape luminescent with a plurality of luminescent colors.

The present disclosure is contrived to achieve the object described above by investigating the configuration of the light guide body.

SUMMARY

That is, a vehicular lamp according to the present disclosure includes: a light source; and a light guide body disposed to cause light emitted from the light source to be incident thereto and then emitted toward a front of the vehicular lamp. The light guide body includes a first rod shaped light guiding portion and a second rod shaped light guiding portion disposed at positions spaced apart from each other, and a planar light guiding portion disposed to connect the circumferential surface portion of the first rod shaped light guiding portion with that of the second rod shaped light guiding portion. The light source includes a first light source disposed to cause light to be incident onto the first rod shaped light guiding portion from an end portion surface of the first rod shaped light guiding portion and a second light source disposed to cause light to be incident onto the second rod shaped light guiding portion from an end portion surface of the second rod shaped light guiding portion, and each of the first light source and the second light source is configured to emit a different color light with each other.

A positional relationship between the "first rod shaped light guiding portion" and the "second rod shaped light guiding portion" is not particularly limited as long as the first and second rod shaped light guiding portions are disposed to be spaced apart from each other.

The planar shape of the "planar light guiding portion" is not particularly limited as long as the circumferential surface portions of the first rod shaped light guiding portion and the second rod shaped light guiding portion are disposed to be connected with each other.

The "first light source" may be disposed to cause light to be incident either only from one end portion surface of the first rod shaped light guiding portion or also from the other end portion surface thereof. Further, the "second light source" may be disposed to cause light to be incident either only from one end portion surface of the second rod shaped light guiding portion or also from the other end portion surface thereof.

The luminescent colors of the "first light source" and "second light source" are not particularly limited as long as the luminescent colors are different from each other.

As illustrated in the configuration as described above, the vehicular lamp according to the present disclosure includes a light guide body which includes a first rod shaped light guiding portion and a second rod shaped light guiding portion disposed at positions spaced apart from each other and a planar light guiding portion disposed to connect the circumferential surface portions of the first and second rod shaped light guiding portions with each other, and a light source which includes a first light source disposed to cause light to be incident onto the first rod shaped light guiding portion from an end portion surface thereof and a second light source disposed to cause light to be incident onto the second rod shaped light guiding portion from an end portion surface thereof, and the first light source and the second light source are configured to emit a different color light. Therefore, the following operational effects may be obtained.

That is, when the first light source is turned ON, the first rod shaped light guiding portion as well as the planar light guiding portion may become luminescent. Further, when the second light source is turned ON, the second rod shaped light guiding portion as well as the planar light guiding portion may become luminescent. In this case, the luminescent color generated at the time of turning-ON of the first light source is different from that at the time of turning-ON of the second light source, the planar light guiding portion may be seen in a different luminescent color.

As described above, according to the present disclosure, the vehicular lamp equipped with a light guide body may be implemented with a compact configuration while making a luminescent region widened in a planar shape luminescent with a plurality of luminescent colors.

When the configuration described above is configured such that the first light source and the second light source may be turned ON simultaneously, the planar light guiding portion may be seen in a mixed color of two luminescent colors during the simultaneous turning-ON of the first and second light sources.

When the configuration described above is configured such that a rear light source disposed to cause light to be incident onto the planar light guiding portion is disposed at a rear of the planar light guiding portion, the planar light guiding portion may become luminescent more brightly by the turning- ON of the rear light source. In this case, the luminescent color of the "rear light source" may be either the same as that of the first light source or the second light source, or a different luminescent color from that of the first and second light sources.

When the configuration described above is configured such that the light guide body further includes a third rod shaped light guiding portion disposed at a position spaced apart from the first rod shaped light guiding portion in an opposite side to the second rod shaped light guiding portion and a second planar light guiding portion disposed to connect the circumferential surface of the first rod shaped light guiding portion with that of the third rod shaped light guiding portion, and the light source further includes a third light source disposed to cause light to be incident onto the third rod shaped light guiding portion incident from an end portion surface thereof, it is possible to enlarge the luminescent region widened in a planar shape. In this case, the luminescent color of the "third light source" may be either the same as that of the first light source or the second light source, or a different luminescent color from that of the first and second light sources.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3A to 3C are cross sectional views taken along a line III-III of FIG. 2.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described with reference to the accompanying drawings.

Figure 1:
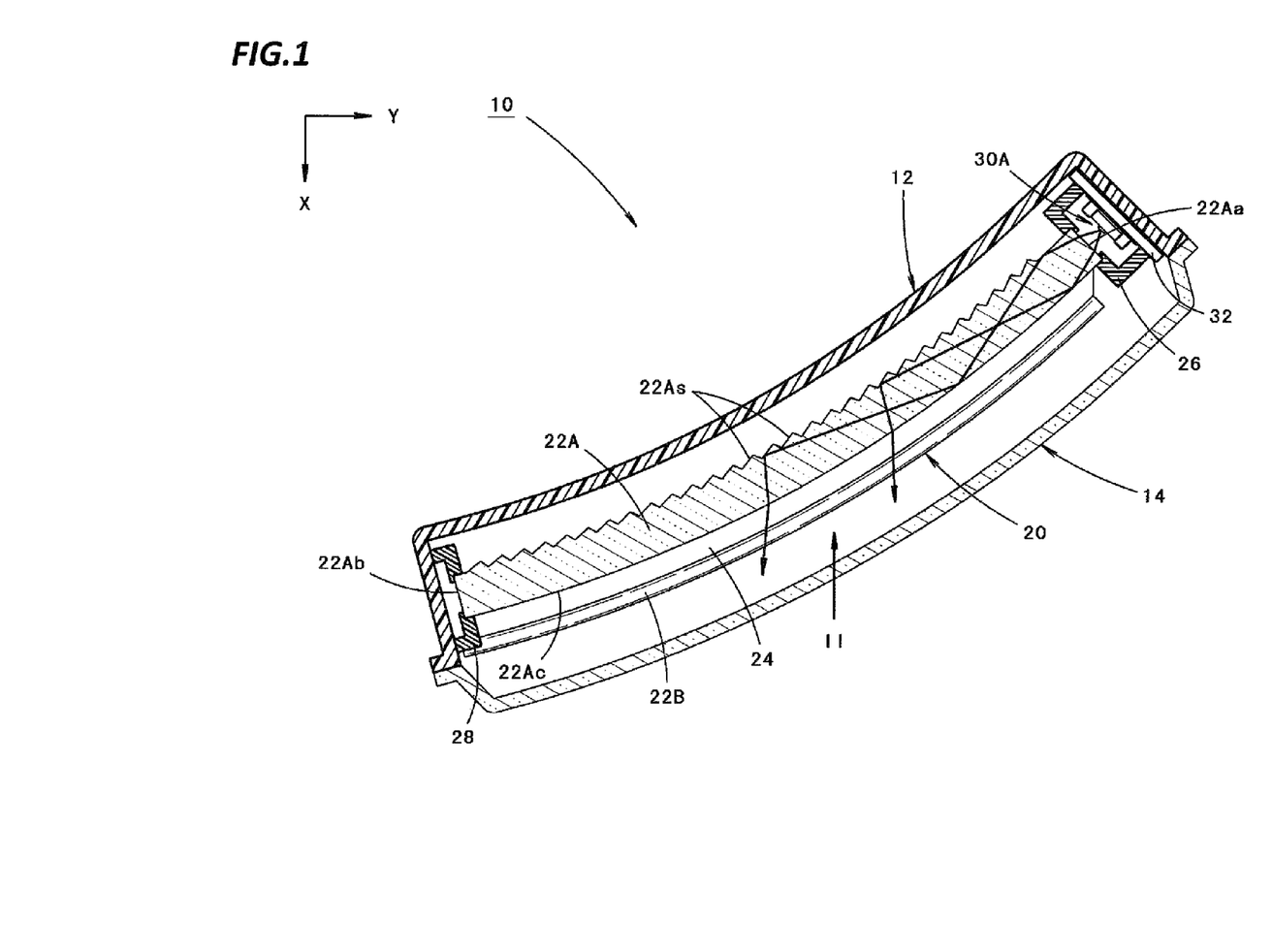
FIG. 1 is a horizontal cross sectional view illustrating an exemplary vehicular lamp according to an embodiment of the present disclosure.
Figure 2:
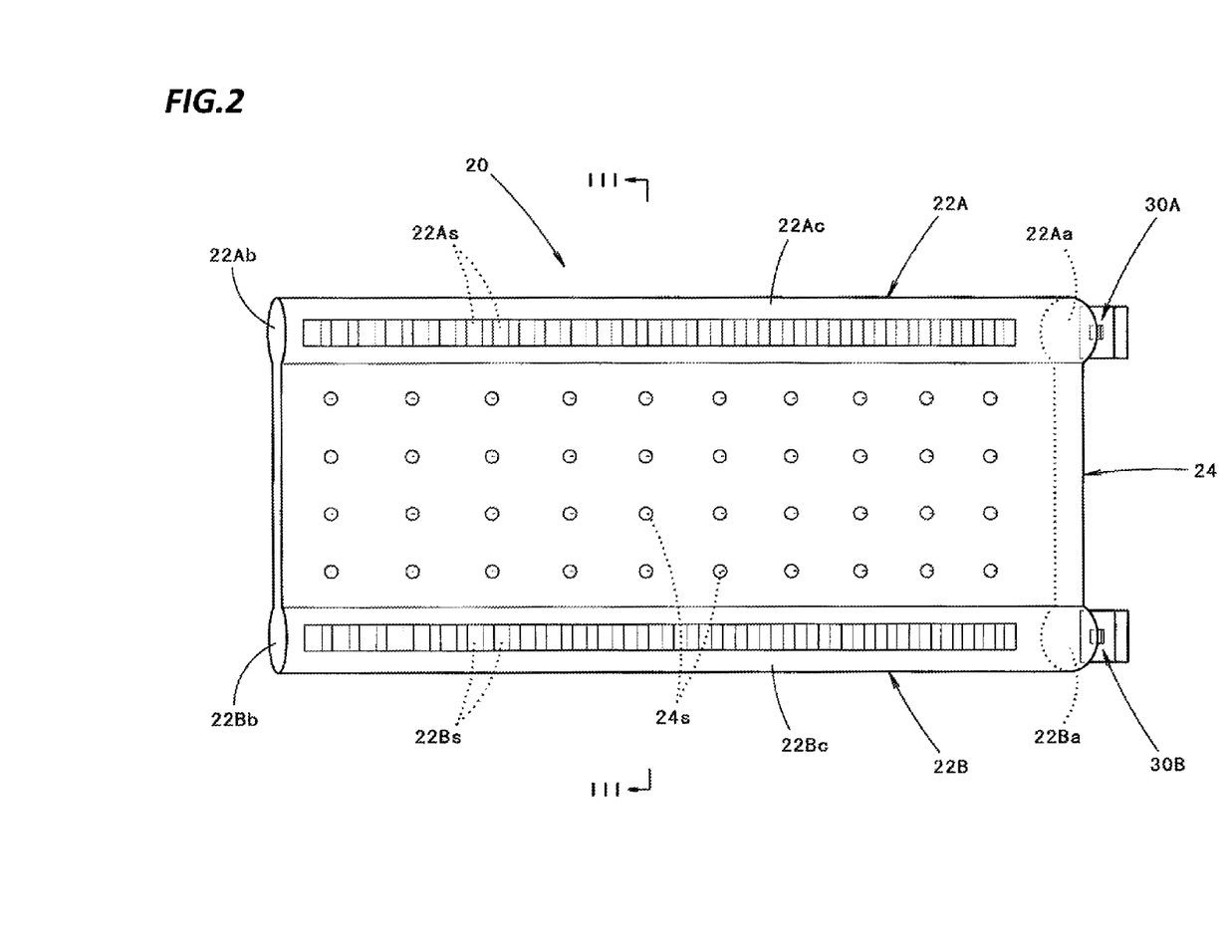
FIG. 2 is a view taken along an arrow II direction of FIG. 1 in which major constitutional elements of the vehicular lamp are illustrated.

FIG. 1 is a horizontal cross sectional view illustrating a vehicular lamp 10 according to an embodiment of the present disclosure. FIG. 2 is a view taken along an arrow II direction of FIG. 1, in which major constitutional elements of the vehicular lamp 10 are illustrated.

As illustrated in FIGS. 1 and 2, the vehicular lamp 10 according to the present embodiment is a combination lamp provided at a left front end portion of the vehicle, and is adapted to serve as a clearance lamp and a front turn signal lamp.

The vehicular lamp 10 is configured such that a light guide body 20 and a first light source 30A and a second light source 30B which emit light to be incident onto the light guide body 20 are inserted into a lamp chamber formed by a lamp body 12 and a transparent cover 14 attached to a front end opening of the lamp body 12.

In the vehicular lamp 10 illustrated in FIG. 1, a direction denoted by X refers to "front" ("front" also in the vehicle), and a direction denoted by Y refers to "left direction" which is orthogonal to "front".

The light guide body 20 is configured by the first rod shaped light guiding portion 22A and the second rod shaped light guiding portion 22B disposed to be extended in a curved shape in a vehicle width direction at a position spaced apart from each other in a vertical direction and a planar light guiding portion 24 disposed to connect the circumferential surface portion 22Ac of the first rod shaped light guiding portion 22A with the circumferential surface portion 22Bc of the second rod shaped light guiding portion 22B. The first and second rod shaped light guiding portions 22A and 22B and the planar light guiding portion 24 are configured by a single member as a transparent synthetic resin mold made of, such as an acrylic resin.

The first rod shaped light guiding portion 22A and the second rod shaped light guiding portion 22B are extended in a curved shape in such a manner that the first and second rod shaped light guiding portions detour rearwardly from the left end portion surfaces 22Ab and 22Bb toward the right end portion surfaces 22Aa and 22Ba, respectively. In this case, in a positional relationship between the first and second rod shaped light guiding portions 22A and 22B, the second rod shaped light guiding portion 22B is positioned slightly more forward than the first rod shaped light guiding portion 22A.

The first light source 30A is a light emitting diode which emits a white color light and is adapted to be turned ON in a clearance lamp turning-ON mode. The first light source 30A is disposed in such a manner that a light-emitting surface thereof orients toward the right end portion surface 22Aa in the vicinity of the right end portion surface 22Aa of the first rod shaped light guiding portion 22A. In the meantime, the second light source 30B is a light emitting diode which emits an amber color light and is adapted to be turned ON in a front turn signal lamp turning-ON mode. The second light source 30B is disposed in such a manner that a light-emitting surface thereof orients toward the right end portion surface 22Ba in the vicinity of the right end portion surface 22Ba of the second rod shaped light guiding portion 22B.

The first light source 30A and the second light source 30B are supported by the light source supporting member 32 and the light source supporting member 32 is supported by the lamp body 12.

The light guide body 20 is supported by the light guide body supporting member 26 at the right end portion thereof and by the light guide body supporting member 28 at the left end portion. Also, the light guide body supporting member 26 is supported by the lamp body 12 through the light source supporting member 32 and the light guide body supporting member 28 is supported by the lamp body 12.

The first rod shaped light guiding portion 22A is configured to cause light emitted from the first light source 30A to be incident from the right end portion surface 22Aa thereof and then, totally reflected on the inside of the first rod shaped light guiding portion 22A and thereafter guided toward the left end portion surface 22Ab. In the meantime, the second rod shaped light guiding portion 22B is configured to cause light emitted from the second light source 30B to be incident from the right end portion surface 22Ba thereof and then, totally reflected on the inside of the second rod shaped light guiding portion 22B and thereafter guided toward the left end portion surface 22Bb.

Figure 3A:
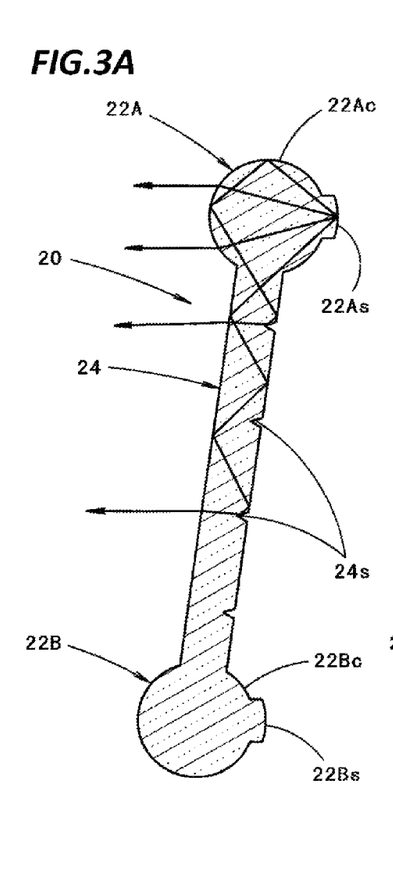
FIG. 3A is a view illustrating a state where a first light source is turned ON, FIG. 3B is a view illustrating a state where a second light source is turned ON, and FIG. 3C is a view illustrating a state where both the first and second light sources are turned ON at the same time.
Figure 3B:
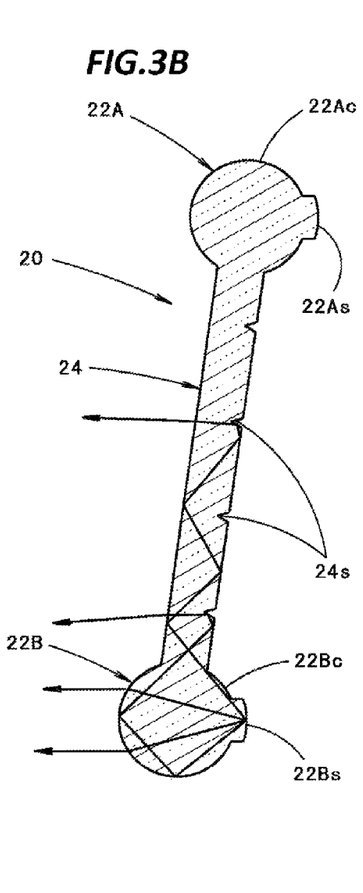
Figure 3C:
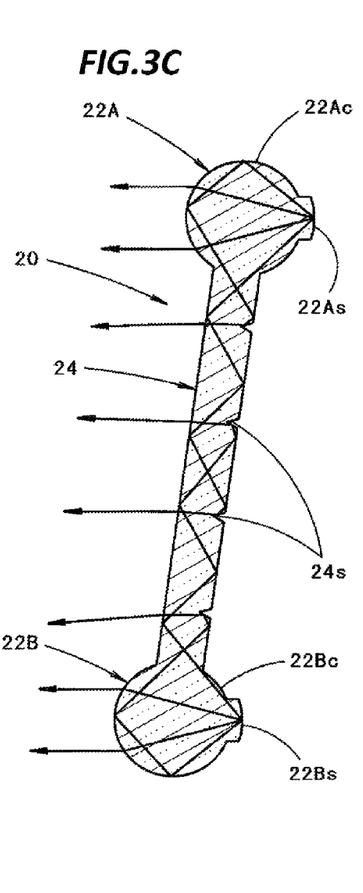

FIGS. 3A to 3C are cross sectional views taken along a line III-III of FIG. 2. FIG. 3A is a view illustrating a state where a first light source is turned ON, FIG. 3B is a view illustrating a state where a second light source is turned ON, and FIG. 3C is a view illustrating a state where both the first and second light sources are turned ON at the same time.

As illustrated in FIGS. 3A to 3C, the circumferential surface portion 22Ac of the first rod shaped light guiding portion 22A is formed in a cylindrical shape, and a plurality of reflective elements 22As are formed at a rear surface of the circumferential surface portion 22Ac. The plurality of reflective elements 22As are consecutively formed in a region of the first rod shaped light guiding portion 22A except for both end portions thereof in a lateral direction [that is, a direction to which the first rod shaped light guiding portion 22A is curved to be extended]. In this case, each reflective element 22As is protruded from the circumferential surface portion 22Ac of the first rod shaped light guiding portion 22A toward an outer peripheral side to be formed in a wedge shaped horizontal cross-section. Also, light internally reflected from each reflective element 22As is emitted from a front surface of the circumferential surface portion 22Ac forwardly, but some of the light is guided from the circumferential surface portion 22Ac to the planar light guiding portion 24.

Similarly, the circumferential surface portion 22Bc of the second rod shaped light guiding portion 22B is formed in a cylindrical shape, and a plurality of reflective elements 22Bs are formed at the rear surface of the circumferential surface portion 22Bc. The plurality of reflective elements 22Bs are consecutively formed in a region of the second rod shaped light guiding portion 22B except for both end portions thereof in a lateral direction. In this case, each reflective element 22Bs is protruded from the circumferential surface portion 22Bc of the second rod shaped light guiding portion 22B toward an outer peripheral side to be formed in a wedge shaped horizontal cross-section. Also, light internally reflected from each reflective element 22Bs is emitted out from a front surface of the circumferential surface portion 22Bc forwardly, but some of the light is guided from the circumferential surface portion 22Bc to the planar light guiding portion 24.

The planar light guiding portion 24 is formed in a planar shape curved in a vehicle width direction and a thickness thereof is set to less than or equal to a value of one half of the diameter dimension of the first light source 30A and the second light source 30B.

A plurality of reflective element 24s which internally reflect the light guided to the planar light guiding portion 24 forwardly are formed on the rear surface of the planar light guiding portion 24. The plurality of reflective element 24s are discretely formed in a region except for both the left and right end portions of the planar light guiding portion 24. Specifically, the plurality of reflective element 24s are formed at equal intervals in the lateral direction and vertical direction. In this case, each reflective element 24s is formed in a concaved cone shape from a rear surface of the planar light guiding portion 24. The light guided to the planar light guiding portion 24 is guided internally but, some of the light is internally reflected toward the front thereof by each reflective element 24s and then, emitted out from a front surface thereof toward the front of the vehicular lamp.

Figure 4A:
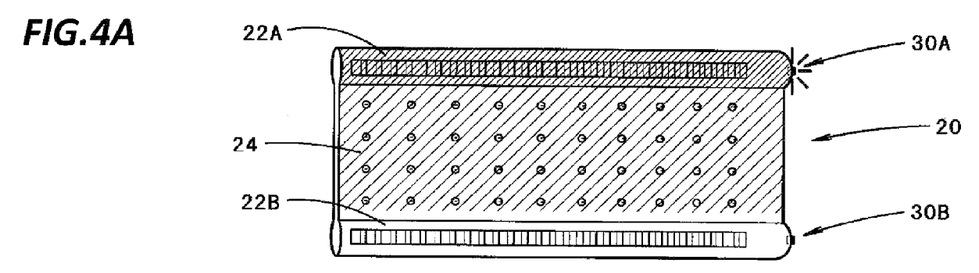
FIGS. 4A to 4C are front views illustrating a light guide body of the vehicular lamp, and FIGS. 4A, 4B and 4C correspond to FIGS. 3A, 3B and 3C, respectively.
Figure 4B:
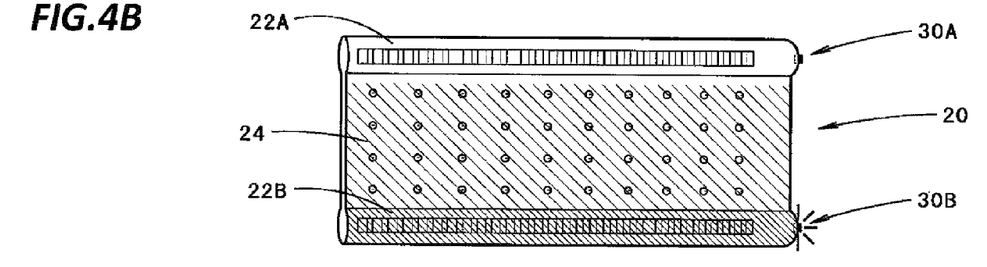
Figure 4C:
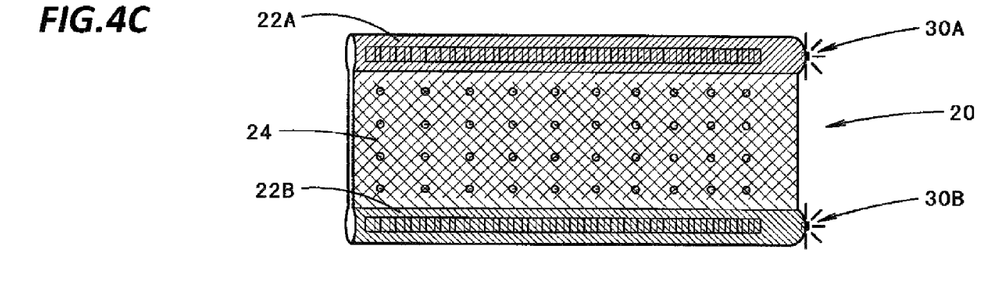

FIGS. 4A to 4C are front views illustrating a light guide body 20, and FIG. 4A is a view illustrating a state where the first light source 30A is turned ON, FIG. 4B is a view illustrating a state where the second light source 30B is turned ON, and FIG. 4C is a view illustrating a state where the first and second light sources 30A, 30B are turned ON at the same time.

As illustrated in FIG. 4A, when only the first light source 30A is turned ON, in the light guide body 20, the first rod shaped light guiding portion 22A is seen in a brightly luminescent white color by the light forwardly emitted out from the first rod shaped light guiding portion 22A and most of the planar light guiding portion 24 is seen in a slightly brightly luminescent white color by the light forwardly emitted out from the planar light guiding portion 24.

As illustrated in FIG. 4B, when only the second light source 30B is turned ON, in the light guide body 20, the second rod shaped light guiding portion 22B is seen in a brightly luminescent amber color by the light forwardly emitted out from the second rod shaped light guiding portion 22B and most of the planar light guiding portion 24 is seen in a slightly brightly luminescent amber color by the light forwardly emitted out from the planar light guiding portion 24.

As illustrated in FIG. 4C, when both the first light source 30A and the second light source 30B are turned ON at the same time, in the light guide body 20, the second rod shaped light guiding portion 22B is seen in a brightly luminescent amber color by the light forwardly emitted out from the second rod shaped light guiding portion 22B while the first rod shaped light guiding portion 22A is seen in a brightly luminescent white color by the light forwardly emitted out from the first rod shaped light guiding portion 22A, and most of the planar light guiding portion 24 is seen in a relatively brightly luminescent mixed color of the white color and the amber color by the light forwardly emitted out from the planar light guiding portion 24.

Next, an operational effect of the present embodiment will be described.

The vehicular lamp 10 according to the present embodiment includes a light guide body 20 configured to include a first rod shaped light guiding portion 22A and a second rod shaped light guiding portion 22B spaced apart from each other in a vertical direction and a planar light guiding portion 24 disposed to connect the circumferential surface portions 22Ac and 22Bc of the first and second rod shaped light guiding portions 22A and 22B with each other, and a light source configured to include a first light source 30A disposed to cause light to be incident onto the first rod shaped light guiding portion 22A from a right end portion surface 22Aa thereof and a second light source 30B disposed to cause light to be incident onto the second rod shaped light guiding portion 22B from a right end portion surface 22Ba thereof, and the first light source 30A and the second light source 30B are configured to emit a different color light. Therefore, the following operational effects may be obtained.

That is, when the first light source 30A is turned ON, the first rod shaped light guiding portion 22A as well as the planar light guiding portion 24 may become luminescent, and further, when the second light source 30B is turned ON, the second rod shaped light guiding portion 22B as well as the planar light guiding portion 24 may become luminescent. In this case, since the luminescent light at the time of turning-ON of the first light source 30A is different from that at the time of turning-ON of the second light source 30B, it is possible to make the luminescent color of the planar light guiding portion 24 look differently from the luminescent colors of the first and second rod shaped light guiding portions.

As described above, according to the present embodiment, in the vehicular lamp 10 equipped with the light guide body 20, the vehicular lamp may be implemented with a compact configuration while making a luminescent region widened in a planar shape luminescent with a plurality of luminescent colors.

Further, since the present embodiment is configured such that the first light source 30A and the second light source 30B may be turned ON simultaneously, the planar light guiding portion 24 may be seen in a mixed color of two luminescent colors during the simultaneous turning-ON of the first and second light sources.

In the embodiment, description is made for a case where each of the reflective elements 22As and 22Bs is formed in a wedge shaped horizontal cross section to be consecutive in a lateral direction, but each of the reflective elements 22As and 22Bs may be formed in a cross sectional shape other than the wedge shape or discretely formed in a lateral direction.

In the embodiment, description is made for a case where a plurality of reflective element 24s are formed on the rear surface of the planar light guiding portion 24, but light diffusion treatment, such as a wrinkle machining, may be performed on the rear surface or the front surface of the planar light guiding portion 24 instead of forming the plurality of reflective element 24s on the rear surface thereof.

In the embodiment, description is made for a case where the first light source 30A and the second light source 30B are disposed in the vicinity of the right end portion surface 22Aa of the first rod shaped light guiding portion 22A and the right end portion surface 22Ba of the second rod shaped light guiding portion 22B, respectively, but the first and second light sources 30A and 30B may be disposed either in the vicinity of the left end portion surfaces 22Ab and 22Bb of the first and second rod shaped light guiding portions 22A and 22B, respectively, or in the vicinity of the right end portion surfaces 22Aa and 22Ba and the left end portion surfaces 22Ab and 22Bb of first and second light sources 30A and 30B, respectively.

In the embodiment, description is made for a case where a light emitting diode is utilized as the first light source 30A and the second light source 30B, but any type of light source other than the light emitting diode may be utilized.

In the embodiment, description is made for a case where the first rod shaped light guiding portion 22A and the second rod shaped light guiding portion 22B are disposed to be extended in a curved shape in a vehicle width direction, but the first and second rod shaped light guiding portions 22A and 22B may be disposed to be extended in a vertical direction or an inclination direction other than the vertical direction.

In the embodiment, description is made for a case where the vehicular lamp 10 is a combination lamp provided on the left end portion of the vehicle, but the same configuration as that of the embodiment described above is adopted to obtain the same effect as that of the embodiment irrespective of a place provided for installation in a vehicle or function of the vehicular lamp. For example, the vehicular lamp 10 may be configured as a combination lamp provided on the right rear end portion of the vehicle. In this case, when the first light source 30A is configured by a light emitting diode which emits a red light and is adapted to be turned ON in a tail lamp turning-ON mode, the vehicular lamp may be a combination lamp serving as a tail lamp and a rear turn signal lamp.

Next, a modified example of the embodiment described above.

First, a first modified example of the embodiment will be described.

Figure 5:
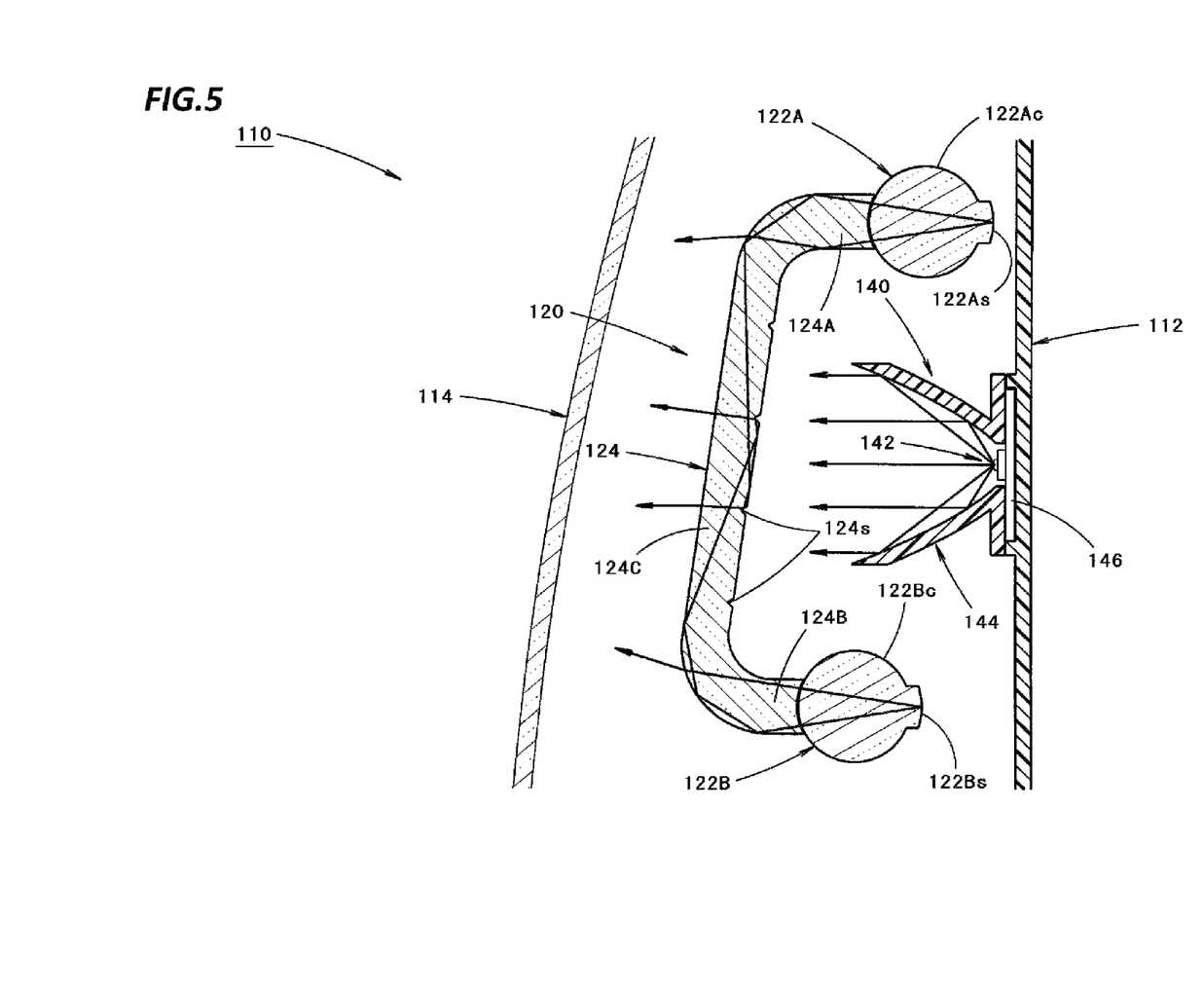
FIG. 5 is a lateral cross sectional view illustrating major components of a first modified example of the embodiment.

FIG. 5 is a lateral cross sectional view illustrating a vehicular lamp 110 according to the first modified example.

As illustrated in FIG. 5, a configuration of the light guide body 120 in the first modified example is different from that of the light guide body 20 in the embodiment.

That is, the light guide body 120 of the modified example is configured by the first rod shaped light guiding portion 122A and the second rod shaped light guiding portion 122B disposed at a position spaced apart from each other in a vertical direction and a planar light guiding portion 124 disposed to connect the circumferential surface portion 122Ac of the first rod shaped light guiding portion 122A with the circumferential surface portion 122Bc of the second rod shaped light guiding portion 122B. However, these guiding portions are formed as separate members.

In this case, placements and cross sectional shapes of the first and second rod shaped light guiding portions 122A and 122B are the same as those of the first and second rod shaped light guiding portions 22A and 22B, respectively. In the meantime, the planar light guiding portion 124 is configured by a main body part 124C extended in a vertical direction while being slightly inclined backwardly to be substantially in parallel with the transparent cover 114 and an upper end portion 124A and a lower end portion 124B curved to be extended horizontally toward the rear thereof at both the upper end and lower end positions of the main body part 124C in a front side positioned more forward than the first rod shaped light guiding portion 122A and the second rod shaped light guiding portion 122B. Also, the planar light guiding portion 124 is attached to the front surface of the circumferential surface portions 122Ac and 122Bc of the first and second rod shaped light guiding portions 122A and 122B in the rear end portion surface of the upper and lower end portions 124A and 124B, respectively.

Further, in the present modified example, the same first light source and the second light source as the first light source 30A and the second light source 30B of the embodiment described above are disposed similarly as in the embodiment.

Further, in the present modified example, light emitted from the first light source and the second light source are caused to be incident into the first rod shaped light guiding portion 122A and the second rod shaped light guiding portion 122B, and then reflected from the plurality of reflective elements 122As and 122Bs formed on the rear surface of the circumferential surface portions 122Ac and 122Bc, respectively. In this case, most of the light internally reflected from each of the reflective elements 122As and 122Bs and reached the front surfaces of the circumferential surface portions 122Ac and 122Bc are guided to the upper and lower end portions 124A and 124B of the planar light guiding portion 124, respectively.

Also, some portion of the light guided to the upper and lower end portions 124A and 124B of the planar light guiding portion 124 of the planar light guiding portion 124 are emitted toward the front thereof from the upper and lower end portions 124A and 124B, respectively, and the remaining portion of the light is guided up to the main body part 124C of the planar light guiding portion 124 and then internally reflected toward the front thereof from the reflective elements 124s formed on the plurality of places of the rear surface thereof, and thereafter emitted toward a front of the vehicular lamp from the front surface thereof.

In the present modified example, a plurality of the light source units 140 are disposed to be spaced apart from each other in a vehicle width direction in the rear side of the light guide body 120.

Each of the light source unit 140 is configured to include a rear light source 142 disposed to be oriented forwardly in the rear of the planar light guiding portion 124 and a reflector 144 which reflects the light emitted from the rear light source 142 forwardly. In this case, the rear light source 142 is a light emitting diode which emits an amber light and is adapted to be turned ON in a front turn signal lamp turning-ON mode. The rear light source 142 is supported by the lamp body 112 through the light source supporting member 146 and the reflector 144 is supported by the lamp body 112.

By adopting the configuration of the present modified example, additional turning-ON of the rear light source 142 may cause the planar light guiding portion 124 to be seen by being more brightly luminescent.

In the present modified example, description is made for a case where the plurality of the light source units 140 are disposed, but a configuration in which a single light source unit 140 is disposed may be adopted. Further, either a configuration formed by the rear light source 142 and a lens or a configuration in which only the rear light source 142 is disposed may be adopted as the configuration of each light source unit 140.

Next, a second modified example of the embodiment will be described.

Figure 6:
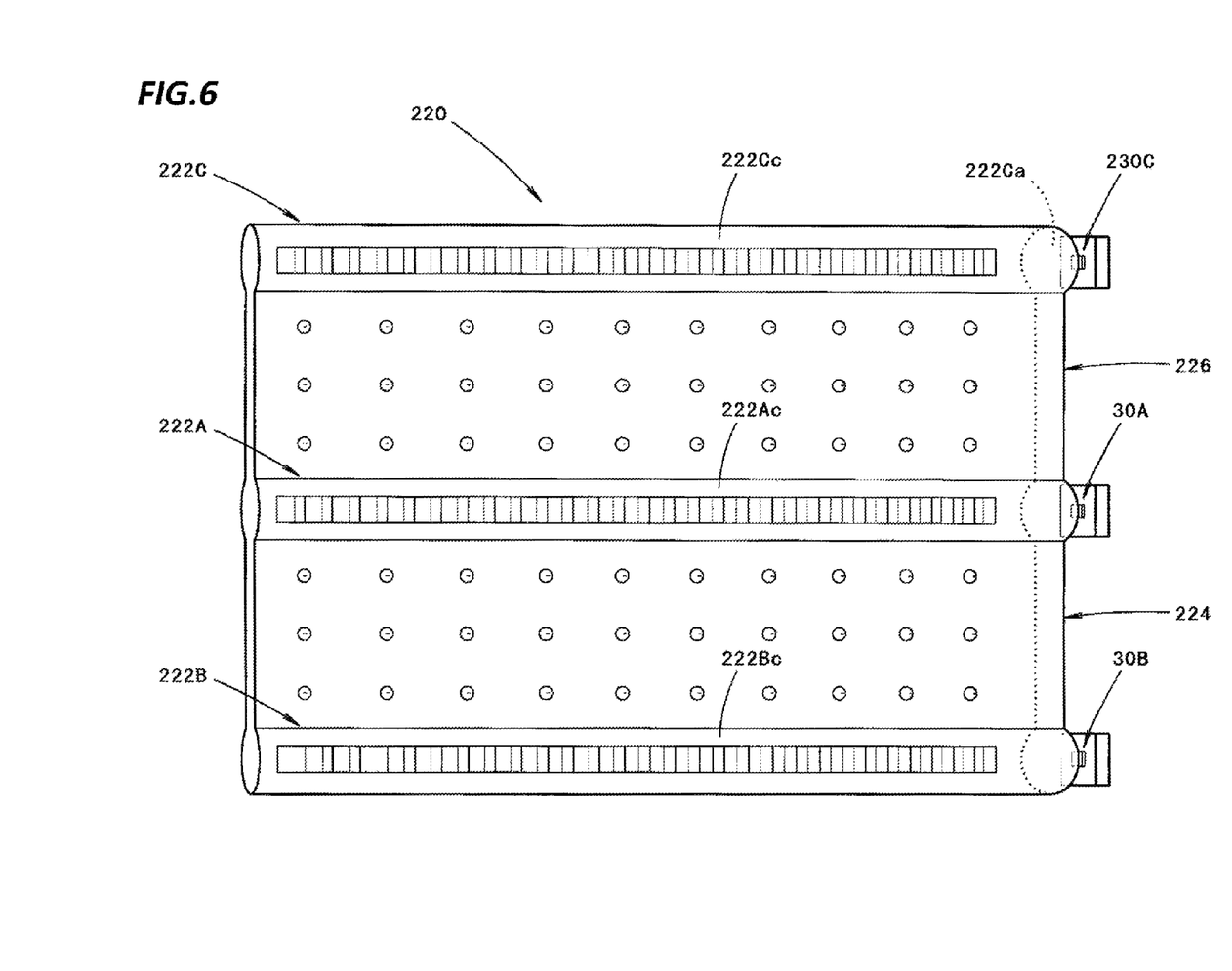
FIG. 6 is a plane cross sectional view which is the same as FIG. 2 and illustrates a second modified example of the embodiment.

FIG. 6 is the same as FIG. 2, and illustrates main constitutional elements of the vehicular lamp according to the second modified example.

As illustrated in FIG. 6, in the second modified example, a configuration of the light guide body 220 in the second modified example is different from that of the light guide body 20 in the embodiment, and further, a third light source 230C is additionally provided.

That is, the light guide body 220 of the second modified example is configured to include the first rod shaped light guiding portion 222A and the second rod shaped light guiding portion 222B disposed at a position spaced apart from each other in a vertical direction and a planar light guiding portion 224 disposed to connect the circumferential surface portions 222Ac of the first rod shaped light guiding portion 222A with the circumferential surface portions 222Bc of the second rod shaped light guiding portion 222B similarly as in the embodiment. However, the present modified example is configured to further include a third rod shaped light guiding portion 222C disposed at a position spaced apart upwardly from the first rod shaped light guiding portion 22A, and a second planar light guiding portion 226 disposed to connect the circumferential surface portion 222Ac of the first rod shaped light guiding portion 222A with the circumferential surface portion 222Cc of the third rod shaped light guiding portion 222C.

In this case, the configurations of the third rod shaped light guiding portion 222C and the second planar light guiding portion 226 are the same as those of the first rod shaped light guiding portion 222A and the planar light guiding portion 224, respectively.

The third light source 230C is a light emitting diode which emits an amber color and is adapted to be turned ON in a front turn signal lamp turning-ON mode. The third light source 230C is disposed in such a manner that a light emitting surface thereof is oriented toward the right end portion surface 222Ca in the vicinity of the right end portion surface 222Ca of the third rod shaped light guiding portion 222C.

The configuration of the present modified example may be adopted to enlarge the luminescent region widened in a planar shape.

In the embodiments and the modified examples thereof, numerical values presented by dimensions are just examples, and, of course, the numerical values may be appropriately set to other values appropriately.

Further, the configuration of the present disclosure is not limited to that of the embodiments and the modified examples, but configuration formed by applying various modification to the embodiments may be adopted.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp, comprising:
   a light source; and
   a light guide body disposed to cause light emitted from the light source to be incident thereto and then emitted toward a front of the vehicular lamp,
   wherein the light guide body includes a first rod shaped light guiding portion and a second rod shaped light guiding portion disposed at positions spaced apart from each other, and a planar light guiding portion disposed to connect a circumferential surface portion of the first rod shaped light guiding portion with that of the second rod shaped light guiding portion,
   the light source includes a first light source disposed to cause light to be incident onto the first rod shaped light guiding portion from an end portion surface of the first rod shaped light guiding portion and a second light source disposed to cause light to be incident onto the second rod shaped light guiding portion from an end portion surface of the second rod shaped light guiding portion,
   a plurality of reflective elements are formed in a rear surface of the planar light guiding portion and a rear surface of the circumferential surface of each of the first and second rod shaped light guiding portions, thereby the light being emitted toward the front of the vehicular lamp by the plurality of reflective elements from the planar light guiding portion and the first and second light guiding portions, and
   each of the first light source and the second light source is configured to emit a different color light with each other.

2. The vehicular lamp according to claim 1, wherein the first light source and the second light source are turned ON at the same time.

3. The vehicular lamp according to claim 1, further comprising a rear light source disposed to cause the light to be incident onto the planar light guiding portion in a rear of the planar light guiding portion.

4. The vehicular lamp according to claim 2, further comprising a rear light source disposed to cause the light to be incident onto the planar light guiding portion in a rear of the planar light guiding portion.

5. The vehicular lamp according to claim 1, wherein the light guide body further includes a third rod shaped light guiding portion disposed at a position spaced apart from the first rod shaped light guiding portion in an opposite side of the second rod shaped light guiding portion and a second planar light guiding portion disposed to connect the circumferential surface of the first rod shaped light guiding portion with that of the third rod shaped light guiding portion, and the light source further includes a third light source disposed to cause light to be incident onto the third rod shaped light guiding portion from an end portion surface of the third rod shaped light guiding portion.

6. The vehicular lamp according to claim 2, wherein the light guide body further includes a third rod shaped light guiding portion disposed at a position spaced apart from the first rod shaped light guiding portion in an opposite side of the second rod shaped light guiding portion and a second planar light guiding portion disposed to connect the circumferential surface of the first rod shaped light guiding portion with that of the third rod shaped light guiding portion, and the light source further includes a third light source disposed to cause light to be incident onto the third rod shaped light guiding portion from an end portion surface of the third rod shaped light guiding portion.

7. The vehicular lamp according to claim 3, wherein the light guide body further includes a third rod shaped light guiding portion disposed at a position spaced apart from the first rod shaped light guiding portion in an opposite side of the second rod shaped light guiding portion and a second planar light guiding portion disposed to connect the circumferential surface of the first rod shaped light guiding portion with that of the third rod shaped light guiding portion, and the light source further includes a third light source disposed to cause light to be incident onto the third rod shaped light guiding portion from an end portion surface of the third rod shaped light guiding portion.

8. The vehicular lamp according to claim 4, wherein the light guide body further includes a third rod shaped light guiding portion disposed at a position spaced apart from the first rod shaped light guiding portion in an opposite side of the second rod shaped light guiding portion and a second planar light guiding portion disposed to connect the circumferential surface of the first rod shaped light guiding portion with that of the third rod shaped light guiding portion, and the light source further includes a third light source disposed to cause light to be incident onto the third rod shaped light guiding portion from an end portion surface of the third rod shaped light guiding portion.

\* \* \* \* \*